United States Patent
Lee et al.

(10) Patent No.: US 8,712,037 B2
(45) Date of Patent: Apr. 29, 2014

(54) DATA ENCODING AND DECODING APPARATUS AND METHOD THEREOF FOR VERIFYING DATA INTEGRITY

(75) Inventors: Yun-Kyung Lee, Daejeon (KR); Sin Hyo Kim, Daejeon (KR); Byung Ho Chung, Daejeon (KR); Sang Woo Lee, Daejeon (KR); Hyeran Mun, Daejeon (KR); Sokjoon Lee, Daejeon (KR); Gun Tae Bae, Daejeon (KR); Jung Yeon Hwang, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 35 days.

(21) Appl. No.: 13/284,813

(22) Filed: Oct. 28, 2011

(65) Prior Publication Data

US 2012/0163582 A1    Jun. 28, 2012

(30) Foreign Application Priority Data

Dec. 23, 2010   (KR) .................. 10-2010-0133773

(51) Int. Cl.
*H04K 1/00* (2006.01)
*H04L 9/00* (2006.01)
*H04L 9/28* (2006.01)

(52) U.S. Cl.
USPC .......................................................... 380/28

(58) Field of Classification Search
USPC .......................................................... 380/28
See application file for complete search history.

(56) References Cited

U.S. PATENT DOCUMENTS

| | | | |
|---|---|---|---|
| 2010/0106920 A1* | 4/2010 | Anckaert et al. | 711/154 |
| 2010/0169667 A1 | 7/2010 | Dewan | |
| 2010/0296649 A1* | 11/2010 | Katzenbeisser et al. | 380/28 |
| 2011/0116625 A1* | 5/2011 | Michiels et al. | 380/28 |
| 2012/0002807 A1* | 1/2012 | Michiels et al. | 380/28 |

FOREIGN PATENT DOCUMENTS

| | | |
|---|---|---|
| KR | 1020030052602 A | 6/2003 |
| KR | 1020060081770 A | 7/2006 |
| KR | 1020100080405 A | 7/2010 |

OTHER PUBLICATIONS

Wil Michiels et al., "Mechanism for Software Tamper Resistance: An Application of White-Box Cryptography", The 7th AMC Workshop on Digital Rights Management, Oct. 29, 2007, pp. 82-89.
Yun-Kyung Lee et al., "Contents Protection Method using White Box Cryptography", Korean Institute of Maritime Information and Communication Sciences, Oct. 29, 2010.

* cited by examiner

*Primary Examiner* — William Powers
*Assistant Examiner* — Stephen Sanders

(57) ABSTRACT

A data encoding apparatus for verifying data integrity by using a white box cipher includes: an encoding unit for encoding content by using a white box cipher table; and an arithmetic logic unit for performing an arithmetic logic operation on the white box cipher table and content information to output an encoded white box cipher table. The arithmetic logic operation is an exclusive OR operation. The content information is license information of the content or hash value of the license information of the content.

20 Claims, 4 Drawing Sheets

DATA ENCODING AND DECODING APPARATUS AND METHOD THEREOF FOR VERIFYING DATA INTEGRITY

CROSS-REFERENCE(S) TO RELATED APPLICATION

The present invention claims priority of Korean Patent Application No. 10-2010-0133773, filed on Dec. 23, 2010, which is incorporated herein by reference.

FIELD OF THE INVENTION

The present invention relates to data encoding and decoding, and more particularly, to a data encoding and decoding apparatus, and method for verifying integrity of data by using a white box cipher, wherein content purchased by a user is encoded by using a white box cipher table, the corresponding white box cipher table is encoded through license information of the content, the encoded content and the white box cipher table are provided to the user, and then the white box cipher table encoded through the license information is decoded, to thereby verify integrity of data, i.e., the license information of the content as well as encoding and decoding of the content.

BACKGROUND OF THE INVENTION

In general, most of encoding and decoding algorithms currently in use are usable for only encoding or decoding of data in the implementation thereof, but in order to verify integrity of decoded data, a separate algorithm for verifying integrity of data should be used.

That is, an integrity verification algorithm for verifying integrity of data has also been used for only verifying integrity of data regardless of the operation of encoding or decoding data.

Meanwhile, according to the content of the thesis known as the method of MEDUSA, integrity verification of a software execution program is performed by combining partial data of a type 2 table among white box cipher tables and a software execution binary file.

However, in case of the MEDUSA, since a software execution program should be prepared, white box cipher stability may not be guaranteed, and further, there may be limitation in an amount of software program able to verify data integrity.

SUMMARY OF THE INVENTION

Therefore, the present invention provides a data encoding and decoding apparatus and method capable of verifying integrity of data by using a white box cipher, wherein content purchased by a user is encoded by using a white box cipher table, the corresponding white box cipher table is encoded through license information of the content, the encoded content and white box cipher table are provided to the user, and then, the white box cipher table encoded through the license information is decoded, to thereby verify integrity of data, i.e., the license information as well as encoding and decoding of content.

In accordance with a first aspect of the present invention, there is provided a data encoding apparatus for verifying data integrity by using a white box cipher including: an encoding unit for encoding content by using a white box cipher table; and an arithmetic logic unit for performing an arithmetic logic operation on the white box cipher table and content information to output an encoded white box cipher table.

In accordance with a second aspect of the present invention, there is provided a data decoding apparatus for verifying data integrity by using a white box cipher including: an arithmetic logic unit for again performing an arithmetic logic operation on an encoded white box cipher table, which is obtained by performing the arithmetic logic operation with content information, and the content information to provide a decoded original white box cipher table; and a decoding unit for decoding the content which is encoded by using the white box cipher table decoded through the arithmetic logic unit and is transmitted to the decoding unit.

In accordance with a third aspect of the present invention, there is provided a data encoding method for verifying data integrity by using a white box cipher including: encoding content by using a white box cipher table; performing an arithmetic logic operation on the white box cipher table and content information to output an encoded white box cipher table; and transmitting the encoded content along with the encoded white box cipher table and the content information to a content purchaser.

In accordance with a fourth aspect of the present invention, there is provided a data decoding method for verifying data integrity by using a white box cipher including: receiving encoded content, a white box cipher table and content information; performing a predetermined arithmetic logic operation on the encoded white box cipher table and the content information, to provide a decoded original white box cipher table; and decoding the content encoded by using the decoded white box cipher table.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT(S)

Figure 1:
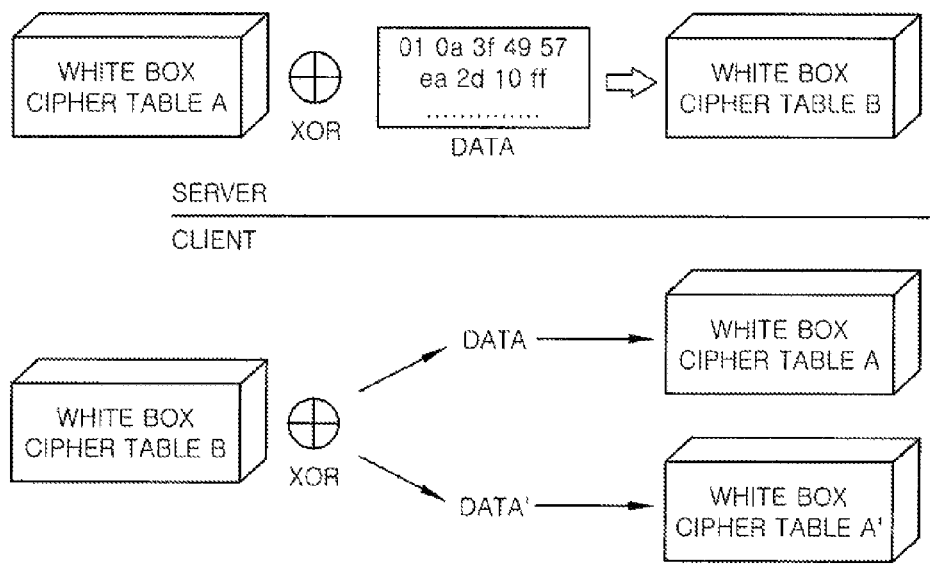
FIG. 1 shows a conceptual diagram of data encoding and decoding and data integrity verification using a white box cipher in accordance with an embodiment of the present invention.

Embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of respective blocks of block diagrams attached herein and respective steps of a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective steps of the sequence diagram.

Moreover, the respective blocks or the respective steps may indicate modules, segments, or some of codes including at least one executable instruction for executing a specific logical function(s). In several alternative embodiments, it is noticed that functions described in the blocks or the steps may run out of order. For example, two successive blocks and steps may be substantially executed simultaneously or often in reverse order according to corresponding functions.

Hereinafter, the embodiment of the present invention will be described in detail with reference to the accompanying drawings which form a part hereof.

FIG. 1 shows a conceptual diagram of data encoding and decoding and data integrity verification using a white box cipher in accordance with the embodiment of the present invention.

Referring to FIG. 1, a server transmits a white box cipher table B obtained by performing an exclusive OR (XOR) operation of data to be integrity verified on respective values of a white box cipher table A, to a client.

Then, the client performs an XOR operation of the data to be integrity verified on the received white box cipher table B. In this case, when the data is not changed, the white box cipher table A may be obtained, and when the data is changed, a white box cipher table A' instead of the white box cipher table A may be obtained.

Therefore, when the client changes the data to be integrity-verified, since the white box cipher table A cannot be restored, encoding and decoding processes cannot be appropriately performed using the white box cipher table.

In this way, in accordance with the embodiment of the present invention, integrity of data is verified while performing the processes of encoding and decoding content, by using the white box cipher table.

Figure 2:
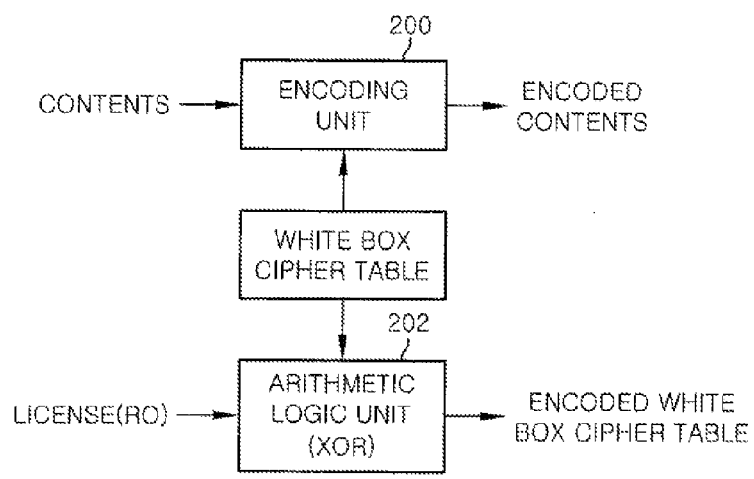
FIG. 2 illustrates a block diagram of a data encoding apparatus using a white box cipher in accordance with the embodiment of the present invention.

FIG. 2 is a block diagram illustrating the configuration of a data encoding apparatus using a white box cipher in accordance with an embodiment of the present invention.

Referring to FIG. 2, a data encoding apparatus implemented in a server encodes content such as digital data or the like by using an encoding unit 200 and a white box cipher table, and encodes a white box used for content encoding by using data such as a license of content or the like and an arithmetic logic unit 202.

In this case, encoding of the content is performed by the encoding unit 200 using the white box cipher table, and the white box cipher table is encoded by passing through the arithmetic logic unit 202 (e.g., through arithmetic operation such as an XOR or the like) together with license (right object: RO) or a hash value of the license.

In this manner, the content encoded using the white box cipher table and the license (in case of a license, since the content is encoded using the white box cipher table, it is not required to have a separate content decoding key and thus the license does not need to be encoded) are transmitted to a client terminal through a communication network.

Figure 3:
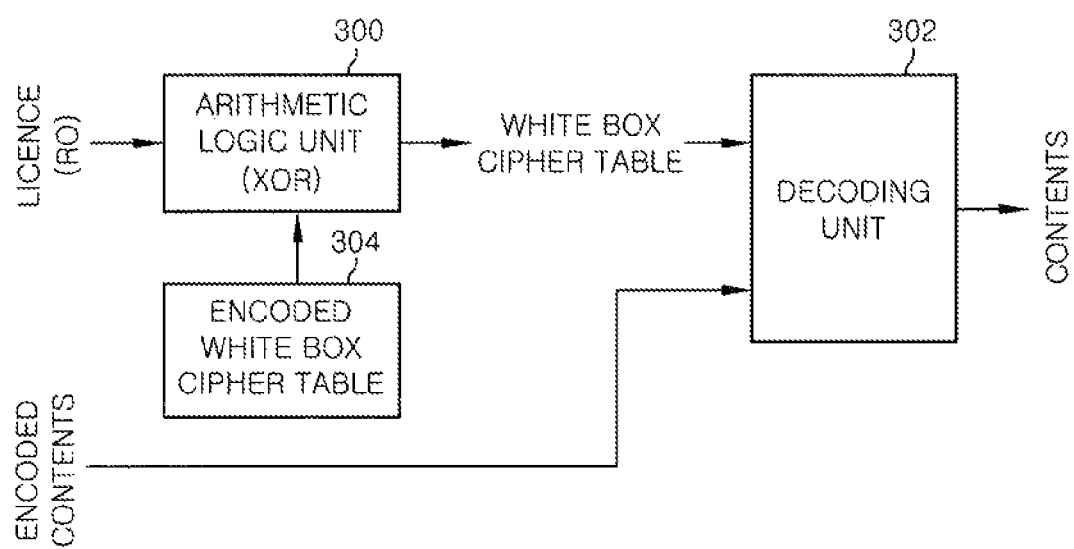
FIG. 3 illustrates a block diagram of a data decoding apparatus using a white box cipher in accordance with the embodiment of the present invention.

FIG. 3 is a block diagram illustrating the configuration of a data decoding apparatus using a white box cipher in accordance with an embodiment of the present invention.

With reference to FIG. 3, a data decoding apparatus implemented in a client terminal includes a decoding unit 302, an arithmetic logic unit 300 and the like to decode data such as encoded content, an encoded white box or the like.

First, with regard to content purchased by a user from an online server or the like, content encoded using a white box cipher table and a license, and an encoded white box cipher table 304 obtained (encoded) by performing an XOR operation with the license are received from the server.

Herein, the content is multimedia content or book content purchased by a user.

At this time, the license RO is input to the arithmetic logic unit 300 of the data decoding apparatus implemented in the client terminal, and the arithmetic logic unit 300 performs an arithmetic operation, e.g., an XOR operation on the license RO and the encoded white box cipher table 304, which has been obtained by performing the XOR operation with the license RO, to thereby decode the encoded white box cipher table to obtain the original white box cipher table before performing the encoding therefor.

The white box so decoded is input to the decoding unit 302 so that decoded content can be obtained based on the decoded white box cipher table from the arithmetic logic unit 300 and the encoded content.

Figure 4:
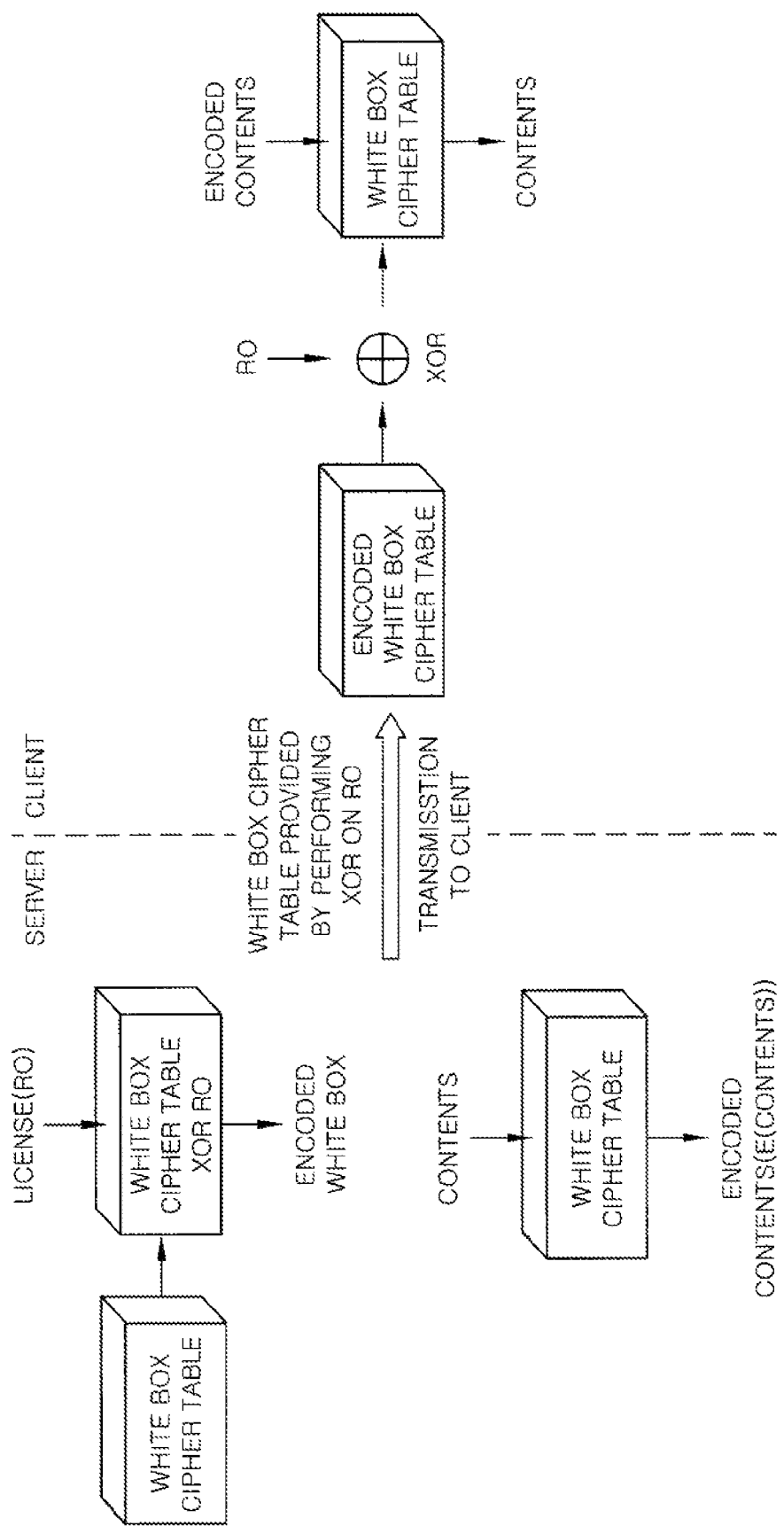
FIG. 4 shows a conceptual diagram of operations performed in the data encoding and decoding apparatuses in FIGS. 2 and 3 in accordance with the embodiment of the present invention.

FIG. 4 shows a conceptual diagram of operations performed in the data encoding and decoding apparatuses in FIGS. 2 and 3 in accordance with an embodiment of the present invention.

Hereinafter, the processes of encoding and decoding data by using a white box cipher will be described once more with reference to FIG. 4.

Content purchased by the user are encoded by using a white box cipher table and the white box cipher table is encoded by performing an XOR operation of the license RO on respective values of the white box cipher table.

The encoded white box cipher table, the encoded content (E(content)), and the license RO are transmitted to the client.

The client terminal having received the encoded content, white box cipher table and the license RO decodes the white box cipher table by using the license Ro. That is, the XOR operation is performed on the license RO and the encoded white box cipher table to thereby restore the original white box cipher table.

Further, the encoded content is decoded by using the restored white box cipher table to thereby decode the content for use. At this time, when the user changes the license RO, since the white box cipher table cannot be properly restored and thus the content cannot be also decoded properly, the content use may be difficult.

That is, in accordance with the embodiment of the present invention, since the XOR operation is performed on the data of license or the like and decoding operation is performed on the encoded content within one processor in a DRM agent sequentially, integrity verification on the data and decoding operation can be performed.

Figure 5:
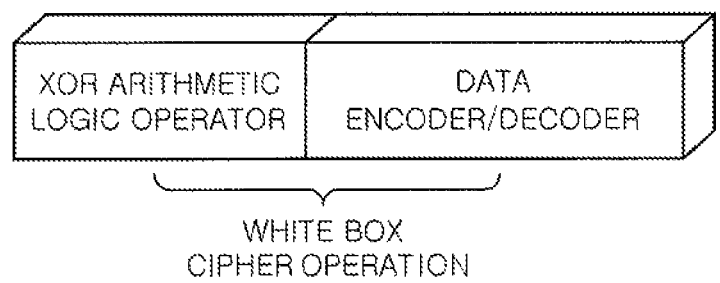
FIG. 5 is a diagram illustrating a white box cipher operation in accordance with an embodiment of the present invention.

Here, the data integrity verification process, in which the XOR operation on data such as a license or the like is performed, may be included in a portion of a white box cipher operation as shown in FIG. 5.

As described above, in accordance with the present invention, content purchased by a user are encoded using a white box cipher table, and the corresponding white box cipher table is encoded based on license information of the content to provide the encoded white box cipher table, and then, the encoded white box cipher table is decoded based on the license information, to thereby verify integrity of the data as well as encoding and decoding on the content.

In addition, in accordance with the present invention, a method capable of decoding the encoded data, with verifying integrity of all kinds of digital data, may be provided. Furthermore, even in case where a client who has purchased digital data does not have a white box cipher table generator, an encoding and decoding method capable of performing integrity verification may be provided, whereby integrity with respect to a large quantity of data may be verified while securing high stability of a white box cipher.

While the invention has been shown and described with respect to the particular embodiments, it will be understood by those skilled in the art that various changes and modification may be made without departing from the scope of the invention as defined in the following claims.

What is claimed is:

1. A data encoding apparatus for verifying data integrity by using a white box cipher, comprising:
    a processor; and
    a non-transitory computer-readable storage medium having
        a license information;
        a data content associated with the license information;
        an unencoded white box cipher table;
        an encoding unit configured to encode the data content using the unencoded white box cipher to produce an encoded data content; and
        an arithmetic logic unit configured to encode the unencoded white box cipher table with the license information to produce an encoded white box cipher table,
    wherein the license information, the encoded data content and the encoded white box cipher table are transmitted to a client,
    wherein the integrity of the data content is verified when the client restores the unencoded white box cipher table using the license information, and
    wherein the integrity of the data content is not verified when the unencoded white box cipher table cannot be restored.

2. The data encoding apparatus of claim 1, wherein the arithmetic logic unit encodes the unencoded white box cipher table using an exclusive OR operation.

3. The data encoding apparatus of claim 2, wherein the the license information used to encode the white box cipher table is the license of the data content or a hash value of the license of the data content.

4. The data encoding apparatus of claim 1, wherein the data content is a multimedia content or a book content purchased by a user online.

5. The data encoding apparatus of claim 1, wherein the license information transmitted to the client is not separately encoded.

6. A data decoding apparatus for verifying data integrity by using a white box cipher, comprising:
    a processor; and
    a non-transitory computer-readable storage medium having
        a license information associated with an encoded data content;
        an encoded data content encoded with an unencoded white box cipher table;
        an encoded white box cipher table encoded with the license information;
        an arithmetic logic unit configured to decode the encoded white box cipher table using the license information to produce an unencoded white box cipher table; and
        a decoding unit configured to decode the encoded data content using the unencoded white box cipher table to produce unencoded data contents,
    wherein the integrity of the data content is verified when the unencoded white box cipher table is restored using the license information, and
    wherein the integrity of the data content is not verified when the unencoded white box cipher table cannot be restored.

7. The data decoding apparatus of claim 6, wherein the arithmetic logic unit decodes the encoded white box cipher table using an exclusive OR operation.

8. The data decoding apparatus of claim 6, wherein the data content is a multimedia content or a book content purchased by a user online.

9. The data decoding apparatus of claim 6, wherein the the license information used to decode the encoded white box cipher table is the license of the data content or a hash value of the license of the data content.

10. A data encoding method for verifying data integrity by using a white box cipher, comprising:
    encoding a data content using an unencoded white box cipher table to produce an encoded data content, wherein the data content is associated with a license information;
    encoding the unencoded white box cipher table using the license information to produce an encoded white box cipher table; and
    transmitting the license information, the encoded data content and the encoded white box cipher table a client,
    wherein the integrity of the data content is verified when the client restores the unencoded white box cipher table using the license information, and
    wherein the integrity of the data content is not verified when the unencoded white box cipher table cannot be restored.

11. The data encoding method of claim 10, wherein the encoding of the unencoded white cipher table uses an exclusive OR operation.

12. The data encoding method of claim 10, wherein the data content is a multimedia content or a book content purchased by a user online.

13. The data encoding method of claim 10, wherein the license information used to encode the white box cipher table is the license of the data content or a hash value of the license of the data content.

14. The data encoding method of claim 10, wherein the license information transmitted to the client is not separately encoded.

15. The data encoding method of claim 10, further comprising
  receiving, by the client, the license information associated with the encoded data content;
  receiving, by the client, the encoded data content encoded with the unencoded white box cipher table;
  receiving, by the client, the encoded white box cipher table encoded with the license information,
  decoding, by the client, the encoded white box cipher table using the license information to produce an unencoded white box cipher table; and
  decoding, by the client, the encoded data content using the unencoded white box cipher table to produce unencoded data contents.

16. A data decoding method for verifying data integrity by using a white box cipher, comprising:
  receiving a license information associated with an encoded data content;
  receiving an encoded data content encoded with an unencoded white box cipher table;
  receiving an encoded white box cipher table encoded with the license information,
  decoding the encoded white box cipher table using the license information to produce an unencoded white box cipher table; and
  decoding the encoded data content using the unencoded white box cipher table to produce unencoded data contents,
  wherein the integrity of the data content is verified when the unencoded white box cipher table is restored using the license information, and
  wherein the integrity of the data content is not verified when the unencoded white box cipher table cannot be restored.

17. The data decoding method of claim 16, wherein the decoding of the encoded white cipher table an exclusive OR operation.

18. The data decoding method of claim 16, wherein the data content is a multimedia content or a book content purchased by a user online.

19. The data decoding method of claim 16, wherein the license information used to decode the white box cipher table is the license of the data content or a hash value of the license of the content.

20. The data decoding method of claim 16, wherein the license information associated with an encoded data content is not separately encoded.

* * * * *